United States Patent [19]

Wooley

[11] Patent Number: 4,674,784

[45] Date of Patent: Jun. 23, 1987

[54] SUCTION-TYPE GRIPPING MECHANISM WITH MAGNETIC ACTUATED VENT VALVE

[75] Inventor: William J. Wooley, Chicago, Ill.

[73] Assignee: Avondale Industries, Inc., New York, N.Y.

[21] Appl. No.: 832,331

[22] Filed: Feb. 24, 1986

[51] Int. Cl.$^4$ .......................... B25J 15/06; B66C 1/02
[52] U.S. Cl. ...................................... 294/64.1; 251/65; 414/627; 414/752
[58] Field of Search ................. 294/64.1, 65; 248/362, 248/363; 251/65; 269/21; 271/90, 94, 103, 107; 279/3; 414/627, 737, 744 B, 752; 901/40

[56] References Cited

U.S. PATENT DOCUMENTS

| | | | |
|---|---|---|---|
| 2,672,827 | 3/1954 | McGowen | 251/65 X |
| 2,915,201 | 12/1959 | Calehuff et al. | 414/627 |
| 3,334,655 | 8/1967 | Eppendahl | 251/65 X |
| 3,625,473 | 12/1971 | Ignatjev | 251/65 |
| 3,834,558 | 9/1974 | Bru | 294/64.1 X |

FOREIGN PATENT DOCUMENTS 1100213  6/1984  U.S.S.R. .............................. 294/64.1

OTHER PUBLICATIONS

IBM Technical Disclosure Bulletin, vol. 20, No. 7, Dec. 1977, "Magnetically Keyed Air Cylinder" by Gates.

Primary Examiner—Johnny D. Cherry
Attorney, Agent, or Firm—Leydig, Voit & Mayer

[57] ABSTRACT

In a suction-type gripping mechanism having an extensible arm with a suction cup attached to the end thereof for gripping and moving non-porous articles, and a vent hole leading to the interior of the suction cup for breaking the suction when desired, an improved valve mechanism for opening and closing the vent hole, the mechanism comprising a movable valve member mounted on the extensible arm and associated with the vent hole at a location remote from the suction cup, the valve member being movable between a first position where it closes the vent hole and a second position where it opens the vent hole, the valve member being made of a magnetically permeable material; a spring biasing the valve member toward the first position; and a permanent magnet located adjacent the path of movement of the valve member for magnetically overcoming the force of the spring biasing and moving the valve member to the second position when the valve member is adjacent the permanent magnet.

4 Claims, 5 Drawing Figures

SUCTION-TYPE GRIPPING MECHANISM WITH MAGNETIC ACTUATED VENT VALVE

TECHNICAL FIELD

The present invention relates generally to machines having extensible arms with suction means for lifting and holding non-porous articles, and, more particularly, to an improved vent valve mechanism for use in such a machine.

BACKGROUND ART

Machines having extensible arms with suction cups for lifting and holding non-porous articles generally include valve mechanisms for venting the suction cups and releasing the articles hold thereby at desired times or positions. Prior art machines of this type have utilized various mechanical systems for actuating the valve mechanisms. These mechanical systems typically comprise a number of moving parts for opening and closing the vent valve at the desired times and/or positions. Because of the high cycling rates of the contacting mechanical parts, they frequently wear out or break, leading to relatively high maintenance costs.

SUMMARY OF THE INVENTION

It is a primary object of the present invention to provide a suction-type gripping mechanism having an improved vent valve mechanism which has only a few moving parts and which provides reliable maintenance free operation over a large number of cycles.

It is another object of the present invention to provide such an improved vent valve mechanism which can be efficiently and economically manufactured at a relatively low cost.

Other objects and advantages of the invention will become apparent upon reading the following detailed description and upon reference to the accompanying drawings.

DESCRIPTION OF THE PREFERRED EMBODIMENT

Figure 1:
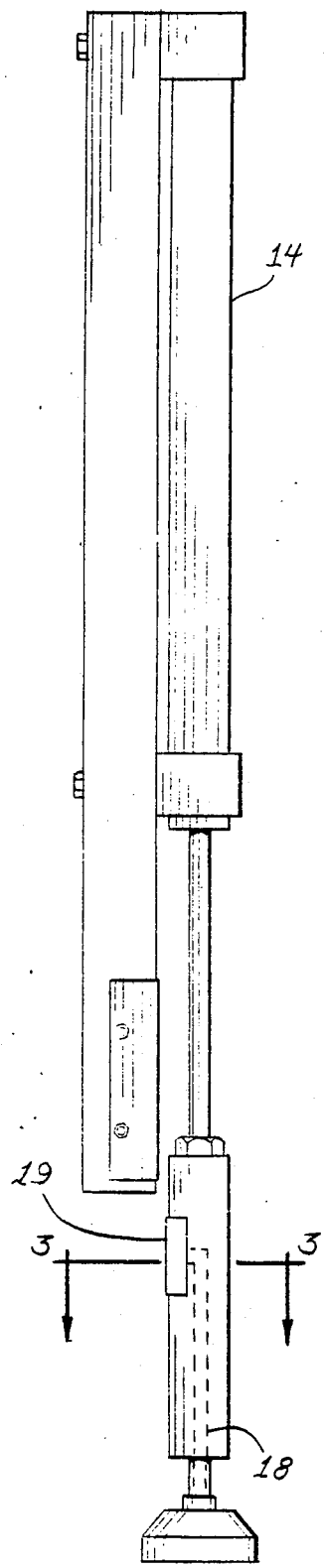
FIG. 1 is a side elevation of a gripping mechanism embodying the improved vent valve of the present invention, with the valve in its closed position.

While the invention is susceptible to various modification and alternative forms, a specific embodiment thereof has been shown by way of example in the drawings and will be described in detail herein. It should be understood, however, that it is not intended to limit the invention to the particular form disclosed, but, on the contrary, the intention is to cover all modifications, equivalents, and alternatives falling within the scope of the invention as defined by the appended claims.

Referring now to FIG. 1, a suction-type gripping mechanism has a suction cup 10 mounted on the lower end of a valve stem 11 depending from a valve body 12. The valve body is carried on the end of an extensible arm formed by a piston rod 13. The piston rod 13 is advanced and retracted by pneumatic or hydraulic pressure acting on a piston (not shown) fastened to the upper end of the piston rod 13 inside a cylinder 14. The cylinder 14 is mounted on an elongated frame member 15 by a pair of brackets 16 and 17.

In order to grip a workpiece or other article, the piston rod 13 is advanced downwardly to urge the suction cup 10 into engagement with the surface of the article to be gripped. The suction cup is flattened as it is pressed against the surface of the article to be gripped, thereby expelling air from the interior of the suction cup. This air exits the suction cup laterally through the interface between the lip of the suction cup and the surface being gripped, and may also exit through a vent hole 18 leading from the interior of the suction cup upwardly through the valve stem 11 and the valve body 12 to a movable valve member 19. As will be described in more detail below, this valve member 19 is normally held in a closed position by means of biasing springs, but under certain conditions the spring bias can be overcome by the increased air pressure inside the suction cup as it is forced against the article being gripped. Of course, if the valve member 19 does open in response to the increased air pressure inside the suction cup 10, the valve member remains open only momentarily and is immediately closed by the spring bias as soon as all the air has been expelled from the suction cup. The valve must remain closed in order to maintain the suction by which an article is held by the suction cup 10, and thus the gripped article can be released by merely opening the valve.

Figure 3:
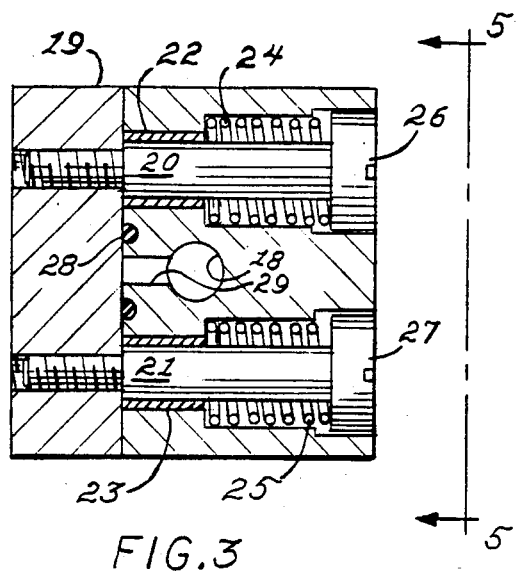
FIG. 3 is an enlarge section taken generally along line 3—3 in FIG. 2.
Figure 5:
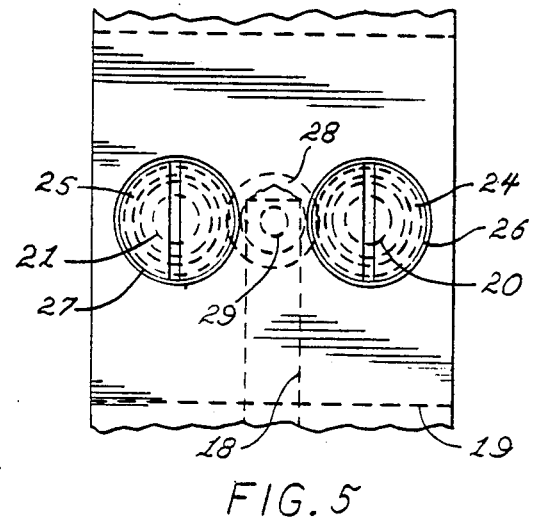
FIG. 5 is a partial side view of the improved valve taken generally along line 5—5 in FIG. 3.

To permit movement of the valve member 19 between its open and closed positions, the valve member is fastened to a pair of guide pins 20 and 21 which slide back and forth within a pair of bushings 22 and 23 in the valve body 12. The guide pins 20 and 21 are normally urged to the right, as viewed in FIGS. 3 and 4, by a pair of springs 24 and 25 which apply biasing forces to enlarged heads 26 and 27, respectively, on the ends of the guide pins 20 and 21. The biasing forces exerted by the springs 24 and 25 on the heads 26 and 27 pull the valve member 19 against an O-ring 28 surrounding the end of the port 29 communicating with the top of the vent hole 18. The O-ring 28 is held captive in a groove formed in the valve body 12, around the port 29. When the valve member 19 is pressed against the O-ring 28, the valve is in its closed position, sealing off the vent port 18 and thereby maintaining the suction in the suction cup 10.

Figure 4:
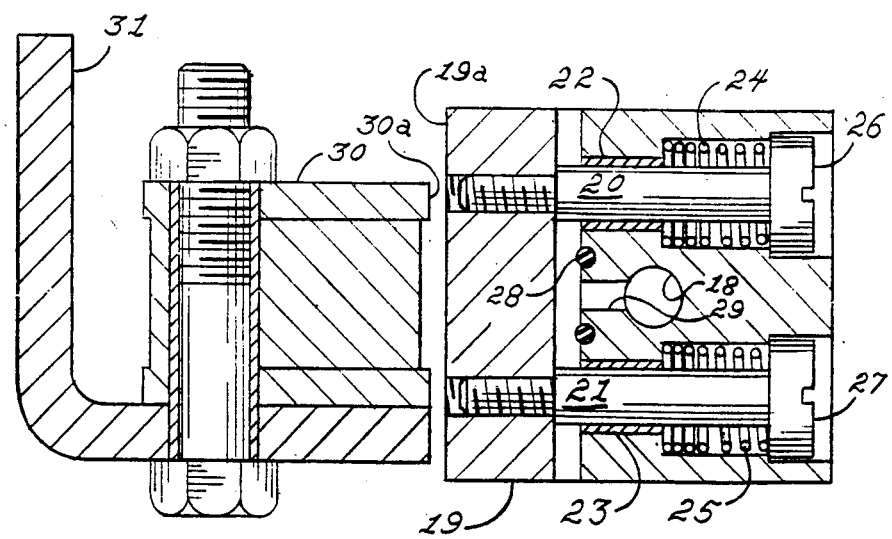
FIG. 4 is an enlarge section taken generally along line 4—4 in FIG. 2.

In accordance with an important aspect of the present invention, the movable valve member is made of a magnetically permeable material, and a permanent magnet is located adjacent the path of movement of the valve member for magnetically overcoming the force of the spring biasing means and moving the valve member to its closed position whenever the valve member is positioned adjacent the permanent magnet. Thus, in the illustrative bodiment of FIGS. 1-4, a permanent magnet 30 is mounted on the frame member 15 by means of a bracket 31. The permanent magnet 30 forms a flat face 30a which is parallel to the outside face 19a of the movable valve member 19. The valve member 19 is made of a magnetically permeable material, such as a ferrous metal, and the face 30a of the permanent magnet 30 is located sufficiently close to the path of the valve member 19 that the valve member is advanced to its open position whenever it is adjacent to permanent magnet 30. In other words, the magnetic forces exerted on the valve member 19 by the permanent magnet 30 are sufficient to overcome the biasing forces of the springs 24 and 25, thereby opening the valve and the vent port 18 to break the suction in the suction cup 10. This open position of the valve is illustrated in FIG. 4, and it is this open position that causes the suction cup to release the article gripped thereby.

Figure 2:
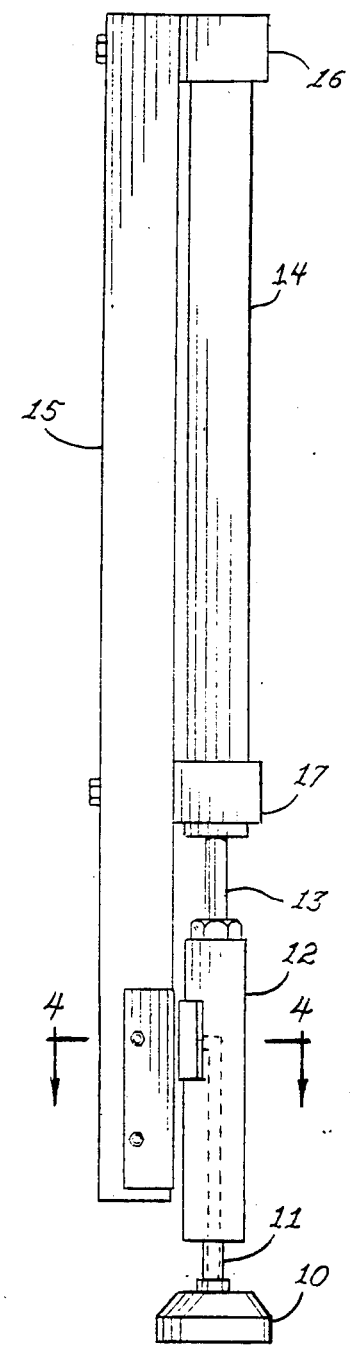
FIG. 2 is the same side elevation shown in FIG. 1 but with the valve in its open position.

As can be most clearly seen in FIGS. 1 and 2, the illustrative suction-type gripper has the suction cup 10 and the valve body 12 aligned with the axis of the extensible arm formed by the piston rod 13, thereby avoiding any offset loads on the gripping mechanism. The movable valve member and the permanent magnet are slightly offset from the axis of the extensible rod, but the magnetic force exerted on the movable valve member by the permanent magnet is sufficiently small that it does not exert any appreciable load on the overall gripping mechanism.

As can be seen from the foregoing detailed description, this invention provides a suction-type gripping mechanism having an improved vent valve mechanism which has only a few moving parts and which provides reliable maintenance-free operation over a large number of cycles. There are only a few simple moving parts, and thus there is little to go wrong. This improved vent valve mechanism can also be efficiently and economically manufactured at a relatively low cost.

I claim:

1. In a suction-type gripping mechanism having an extensible arm with a suction cup attached to the end thereof for gripping and moving non-porous articles, and a vent hole leading to the interior of said suction cup for breaking the suction when desired, an improved valve mechanism for opening and closing said vent hole, said valve mechanism comprising a movable valve member mounted on said extensible arm and associated with said vent hole at a location remote from said suction cup, said valve member being movable between a first position where it closes said vent hole and a second position where it opens said vent hole, said valve member being made of a magnetically permeable material, spring means biasing said valve member toward said first position, and a permanent magnet located adjacent the path of movement of said valve member for magnetically overcoming the force of said spring biasing means and moving said valve member to said second position when said valve member is adjacent said permanent magnet.

2. The mechanism of claim 1 wherein said extensible arm, said suction cup, and said vent hole are all aligned with each other on a common axis.

3. The mechanism of claim 1 wherein said extensible arm is the piston rod of a fluid-operated piston and cylinder.

4. The mechanism of claim 1 wherein said movable valve member is mounted on a pair of guide pins, and said spring biasing means comprises a pair of coil springs urging said guide pins and said valve member to said closed position.

* * * * *